US012691705B1

(12) United States Patent
Li

(10) Patent No.: US 12,691,705 B1
(45) Date of Patent: Jul. 28, 2026

(54) ROTATABLE WRITING PEN

(71) Applicant: Guixin Li, Shantou (CN)

(72) Inventor: Guixin Li, Shantou (CN)

( * ) Notice: Subject to any disclaimer, the term of this patent is extended or adjusted under 35 U.S.C. 154(b) by 0 days.

(21) Appl. No.: 19/432,086

(22) Filed: Dec. 23, 2025

(30) Foreign Application Priority Data

Dec. 16, 2025 (CN) ......................... 202522676643.4

(51) Int. Cl.
*B43K 29/00* (2006.01)
*B43K 8/00* (2006.01)
*B43M 99/00* (2010.01)
*A63H 33/00* (2006.01)

(52) U.S. Cl.
CPC .............. *B43K 29/00* (2013.01); *B43K 8/003* (2013.01); *B43M 99/008* (2013.01); *A63H 33/00* (2013.01)

(58) Field of Classification Search
CPC .... B43K 23/00; B43K 23/001; B43K 23/002; B43K 23/02; B43K 7/005; B43M 99/001; A65H 33/00
USPC ............................ 401/131; D19/83; 446/396
See application file for complete search history.

(56) References Cited

U.S. PATENT DOCUMENTS

| | | | | |
|---|---|---|---|---|
| 6,039,492 A * | 3/2000 | Chen | B43K 21/006 401/52 |
| 6,568,866 B1 * | 5/2003 | Hsu | B43K 7/005 401/6 |
| D492,357 S * | 6/2004 | Tien | D19/83 |
| 2006/0139929 A1 * | 6/2006 | Gluck | B43M 99/004 362/276 |

FOREIGN PATENT DOCUMENTS

KR 20090009795 U * 9/2009 ............. B43K 23/08

OTHER PUBLICATIONS

Machine Translation of Kwon, KR20090009795U (Year: 2009).*

* cited by examiner

*Primary Examiner* — David P Angwin
*Assistant Examiner* — Bradley S Oliver

(57) ABSTRACT

The present disclosure relates to a rotatable writing pen. The rotatable writing pen includes a pen main body and a supporting structure. The supporting structure is configured for supporting the pen main body, and the pen main body is capable of rotating on the supporting structure. A first groove is defined in the pen main body. An inclined surface is arranged around a periphery of an opening of the first groove.

17 Claims, 7 Drawing Sheets

ROTATABLE WRITING PEN

CROSS-REFERENCE TO RELATED APPLICATIONS

The application claims priority of Chinese patent application CN2025226766434, filed on Dec. 16, 2025, disclosure of which is incorporated herein by reference in its entirety.

TECHNICAL FIELD

The present disclosure relates to the technical field of writing pens, in particular to a rotatable writing pen.

BACKGROUND

A writing pen, defined as a tool for writing or drawing, represents a significant invention in human civilization. It operates by depositing colored solid or liquid medium from a tip onto a substrate such as paper to form characters, symbols, or pictures. With societal advancement, the variety and type of writing pens have greatly expanded, including pencils, brushes, fountain pens, marker pens, highlighters, ballpoint pens, liners, crayons, liquid-ink pens, and so on. Most conventional writing pens have merely a basic writing function. In modern life, where pressure is increasing and work or study may be monotonous, there is a growing demand for writing pens. Therefore, writing pens are expected to offer not only writing function but also enhanced aesthetic appeal and improved user experience. To address these issues, the present disclosure provides a rotatable writing pen. This integrates a rotating function with the practicality of the writing pen, making it visually appealing. Moreover, this can also serve to alleviate stress and regulate mood.

SUMMARY

In order to overcome shortcomings of the existing technology, the present disclosure provides a rotatable writing pen.

The writing pen includes a pen main body and a supporting structure. The supporting structure is configured for supporting the pen main body, and the pen main body is capable of rotating on the supporting structure.

As an improvement of the present disclosure, a first groove is defined in the pen main body, and the first groove is defined adjacent to a center of gravity of the pen main body. A first end of the supporting structure is positioned in the first groove.

As an improvement of the present disclosure, the supporting structure includes a supporting base and a supporting portion. The supporting portion is connected to the supporting base, and the supporting portion is arranged on the supporting base. A top end of the supporting portion is received within the first groove and is configured for abutting against an inner top wall of the first groove.

As an improvement of the present disclosure, the supporting base is provided with an arc-shaped outer surface, and a diameter of the supporting base gradually decreases from top to bottom. A bottom portion of the supporting base is provided with a flat supporting surface. A mounting groove is defined in the bottom portion of the supporting base. The mounting groove is configured for mounting a first anti-slip pad. The supporting surface is arranged around the mounting groove. The supporting structure is further provided with a counterweight groove configured for placing a counterweight member. The counterweight groove is provided with an accommodating opening, and the mounting groove is arranged around an edge of the accommodating opening. The first anti-slip pad is configured for covering the counterweight groove and the mounting groove. The first anti-slip pad is a flexible anti-slip pad.

As an improvement of the present disclosure, the top end of the supporting portion is provided with a first protruding arc-shaped contact surface. The inner top wall of the first groove is provided with a second recessed arc-shaped contact surface. The second arc-shaped contact surface is configured for abutting against the first arc-shaped contact surface.

As an improvement of the present disclosure, an inner side wall of the first groove is a cylindrical side wall. An inclined surface is arranged around a periphery of an opening of the first groove.

As an improvement of the present disclosure, a first gap is provided between the supporting structure and the first groove. A second gap is provided between the supporting structure and an outer edge of the inclined surface. The second gap is larger than the first gap, and a width of the first gap is in a range from 0.1 mm to 3 mm.

As an improvement of the present disclosure, the inclined surface includes a front side section, a rear side section, a left side section, and a right side section. The left side section and the right side section are connected to the front side section and the rear side section. Second gaps are formed between the supporting structure and the front side section as well as between the supporting structure and the rear side section. Third gaps are formed between the supporting structure and the left side section as well as between the supporting structure and the right side section. The third gaps are different from the second gaps.

As an improvement of the present disclosure, the supporting portion includes a transition portion and a first supporting member. The first supporting member is connected to the transition portion. The transition portion is provided with an arc-shaped outer surface, and a diameter of the transition portion gradually decreases from bottom to top. The first supporting member is a cylindrical supporting member.

As an improvement of the present disclosure, the pen main body includes a gripping portion. The gripping portion includes a front gripping portion and a rear gripping portion. The front gripping portion is connected to the rear gripping portion. The front gripping portion is provided with a first protruding arc-shaped gripping surface. The rear gripping portion is provided with a second recessed arc-shaped gripping surface.

As an improvement of the present disclosure, the pen main body further includes a tip sleeve and a first refill. A first cavity is defined in the pen main body, and a first end of the first cavity is provided with a first opening. A first end of the first refill is arranged in the first cavity. A second end of the first refill passes through the first opening and is located at an exterior of the first cavity. The tip sleeve is sleeved on the first refill and is connected to the front gripping portion.

As an improvement of the present disclosure, an end portion of the rear gripping portion is provided with an arc-shaped protective end face. The first groove is defined in the front gripping portion.

As an improvement of the present disclosure, a diameter of the front gripping portion first gradually increases and then gradually decreases along a lengthwise direction, to form the first protruding arc-shaped gripping surface. A diameter of the rear gripping portion first gradually decreases and then gradually increases along a lengthwise direction, to form the second recessed arc-shaped gripping surface.

As an improvement of the present disclosure, a first end of the pen main body is located below the first arc-shaped contact surface. In addition, a second end of the pen main body is located above the first arc-shaped contact surface, so that the pen main body is placed obliquely on the supporting structure.

As an improvement of the present disclosure, a height of the supporting structure is greater than a width of the supporting structure.

As an improvement of the present disclosure, the pen main body includes a first rotating portion and a second rotating portion. The first rotating portion is threadedly connected to the second rotating portion.

As an improvement of the present disclosure, the pen main body further includes a first magnetic attraction member. The first magnetic attraction member is sleeved on a junction between the first rotating portion and the second rotating portion. The first magnetic attraction member is configured for protruding from outer surfaces of the first rotating portion and the second rotating portion. The supporting structure is magnetically attracted to the first magnetic attraction member. The first magnetic attraction member is a first annular magnetic attraction member. The first magnetic attraction member is provided with an arc-shaped magnetic outer surface. The first magnetic attraction member is arranged at a middle portion of the pen main body.

As an improvement of the present disclosure, the writing pen further includes a second refill. A third cavity is defined in the first rotating portion, and a fourth cavity is defined in the second rotating portion. The third cavity is in communication with the fourth cavity. A first end of the second refill is positioned in the fourth cavity. A second end of the second refill passes through the third cavity and is located at an exterior of the first rotating portion.

As an improvement of the present disclosure, the supporting structure includes a second supporting base, and a fifth cavity is defined in the second supporting base. A second magnetic attraction member is arranged in the fifth cavity. The second magnetic attraction member is magnetically attracted to the first magnetic attraction member.

As an improvement of the present disclosure, a second anti-slip pad is arranged at a bottom portion of the second supporting base. A height of the second supporting base is greater than a width of the second supporting base.

Beneficial effects of the present disclosure are as follows. The present disclosure provides a rotatable writing pen. The writing pen includes a pen main body and a supporting structure. The supporting structure is configured for supporting the pen main body, and the pen main body is capable of rotating on the supporting structure. Through the above structure, the supporting structure is capable of supporting the pen main body. Users can pivot the pen main body, causing it to rotate on the supporting structure. This rotation has a stress-relieving function, thereby increasing the entertainment value of the writing pen. The inclined surface can provide a self-guiding function, enabling the pen main body to return automatically to its initial position upon a slight wobble, so as to improve rotational stability. The structure of the inclined surface ensures that the pen main body can automatically return to a central position during rotation, thereby achieving self-alignment. The inner top wall and the inner side wall of the first groove have smooth surfaces, so as to reduce friction during rotation. The first gap serves to reduce a contact area between the supporting structure and the first groove, thereby reducing the friction between the supporting structure and the first groove. This prevents the rotation of the pen main body on the supporting structure from being interrupted due to eccentric friction. Consequently, the number of rotations of the pen main body can be effectively increased, so as to significantly enhance both the stress-relieving effect and visual appeal.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
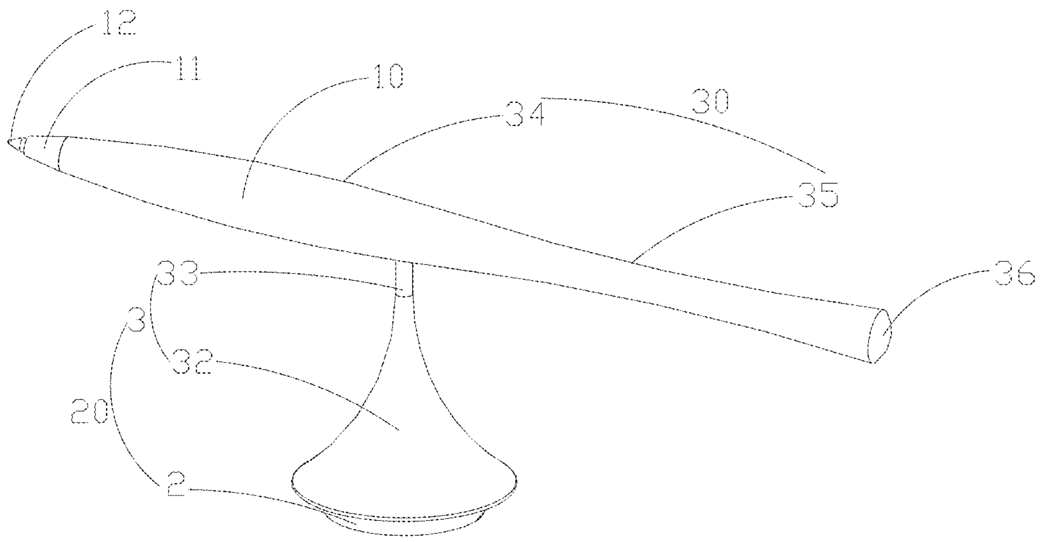
FIG. 1 is a structural diagram of the first embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

The First Embodiment

Figure 2:
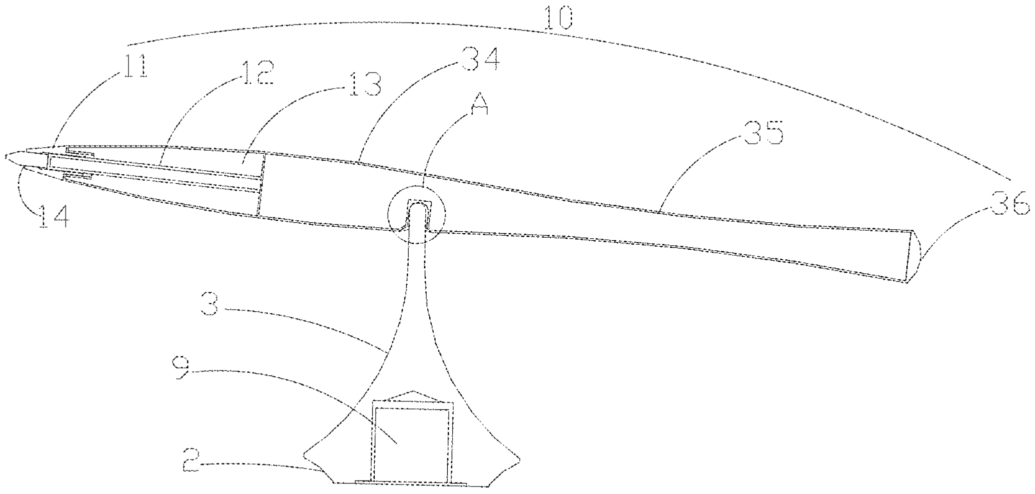
FIG. 2 is a sectional view taken along an X-axis of the first embodiment of the present disclosure.
Figure 3:
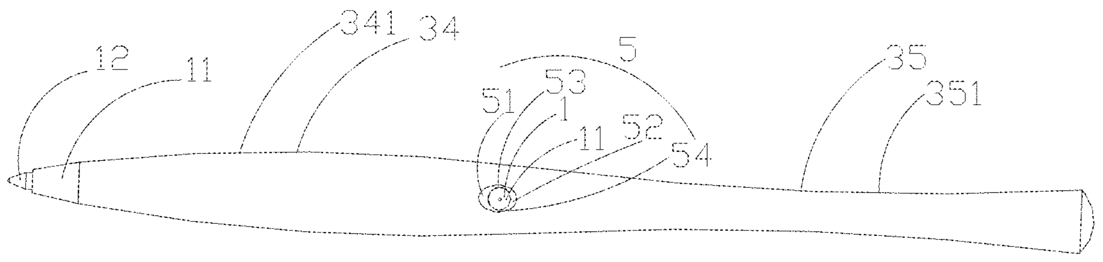
FIG. 3 is a structural diagram of a pen main body in the first embodiment of the present disclosure.
Figure 4:
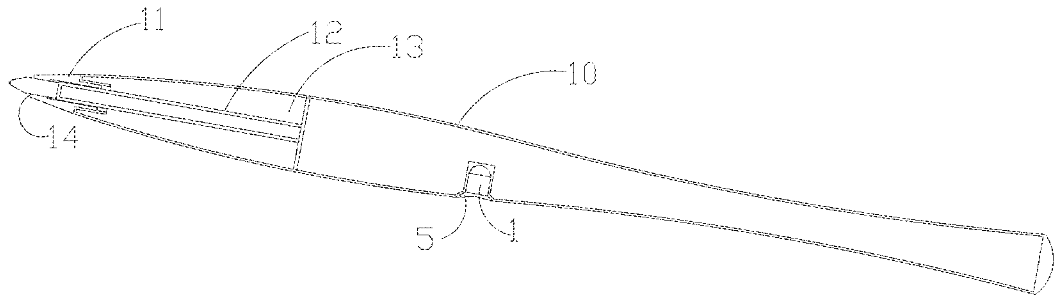
FIG. 4 is a sectional view of the pen main body in the first embodiment of the present disclosure.
Figure 5:
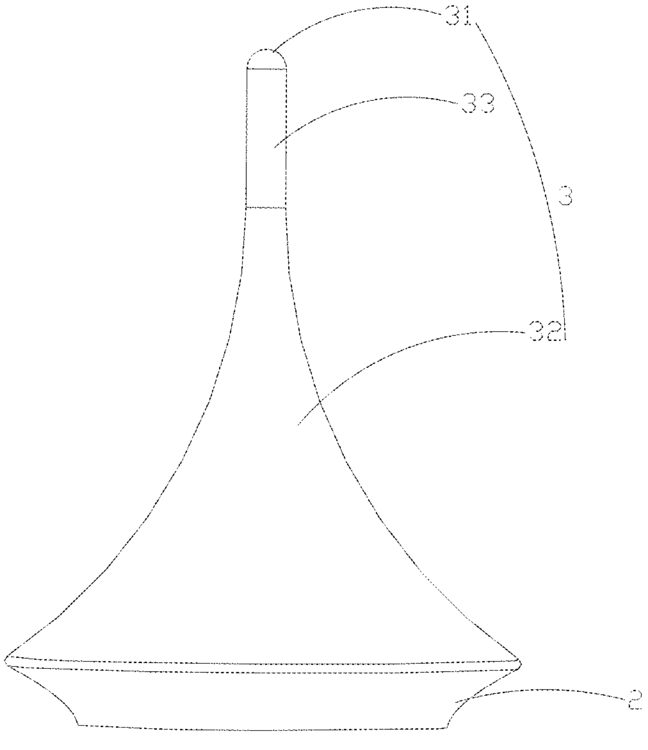
FIG. 5 is a structural diagram of a supporting structure in the first embodiment of the present disclosure.
Figure 6:
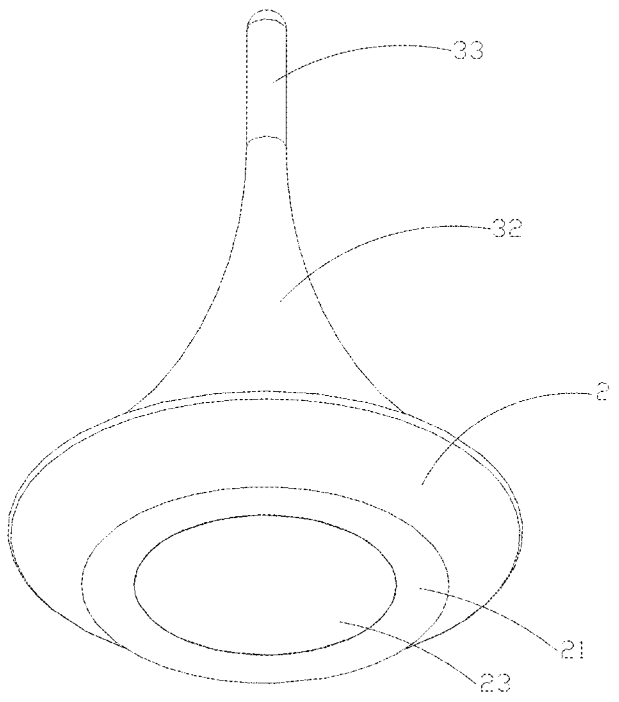
FIG. 6 is a structural diagram of the supporting structure from another angle according to the first embodiment of the present disclosure.
Figure 7:
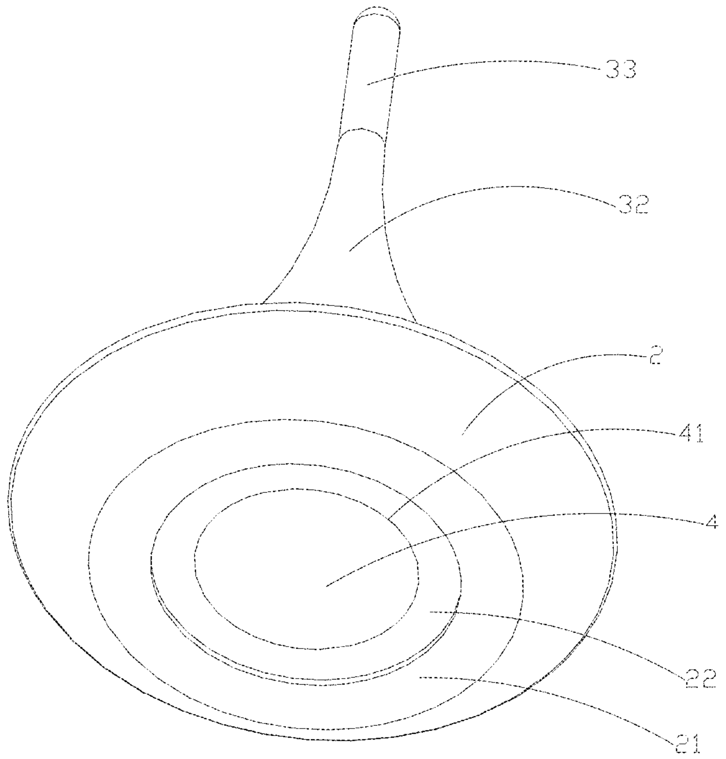
FIG. 7 is a structural diagram of the supporting structure in the first embodiment of the present disclosure, with a first anti-slip pad removed.
Figure 8:
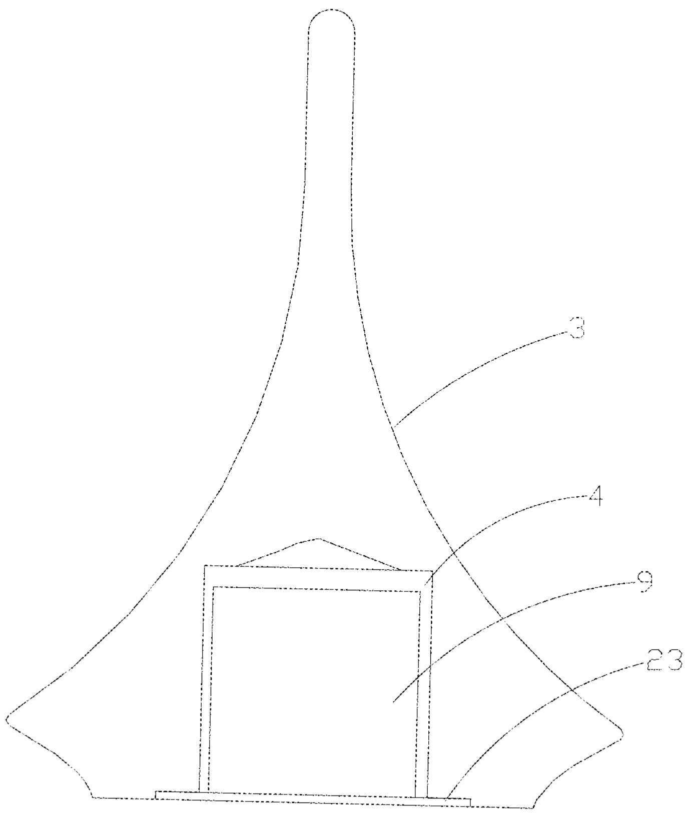
FIG. 8 is a sectional view of the supporting structure in the first embodiment of the present disclosure.
Figure 9:
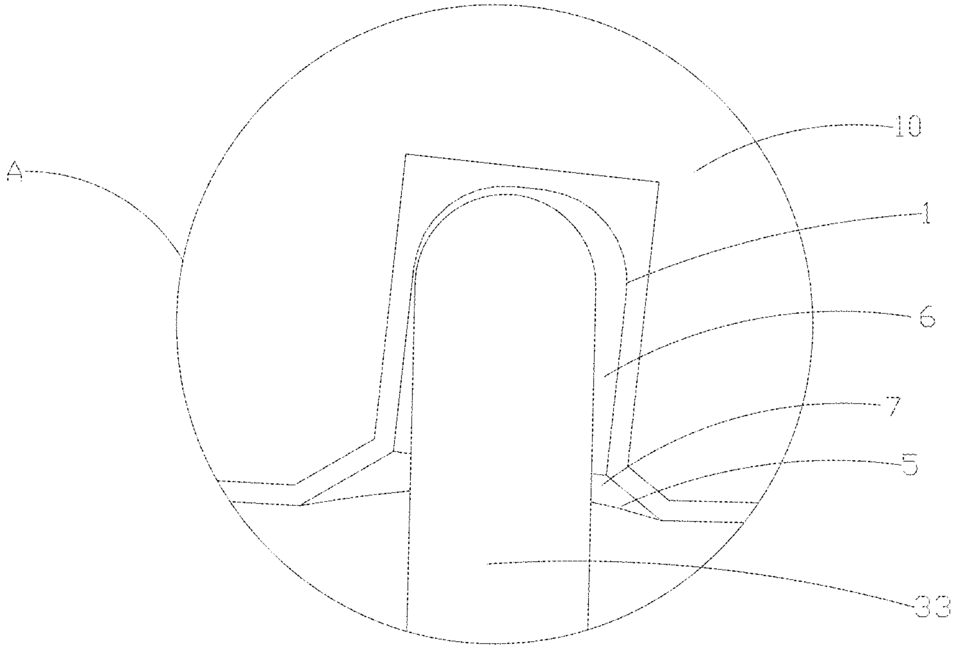
FIG. 9 is a structural diagram of area A in FIG. 2 of the first embodiment of the present disclosure.
Figure 10:
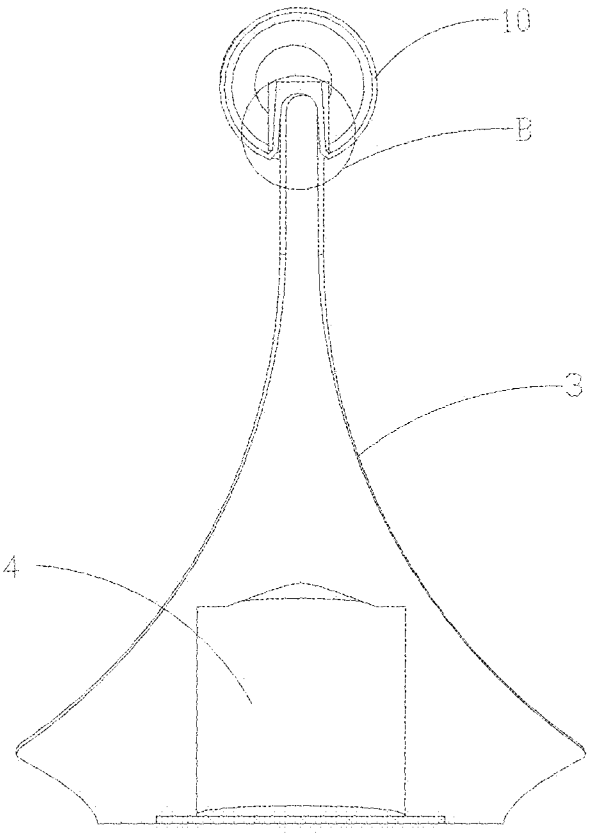
FIG. 10 is a sectional view taken along a Y-axis of the first embodiment of the present disclosure.
Figure 11:
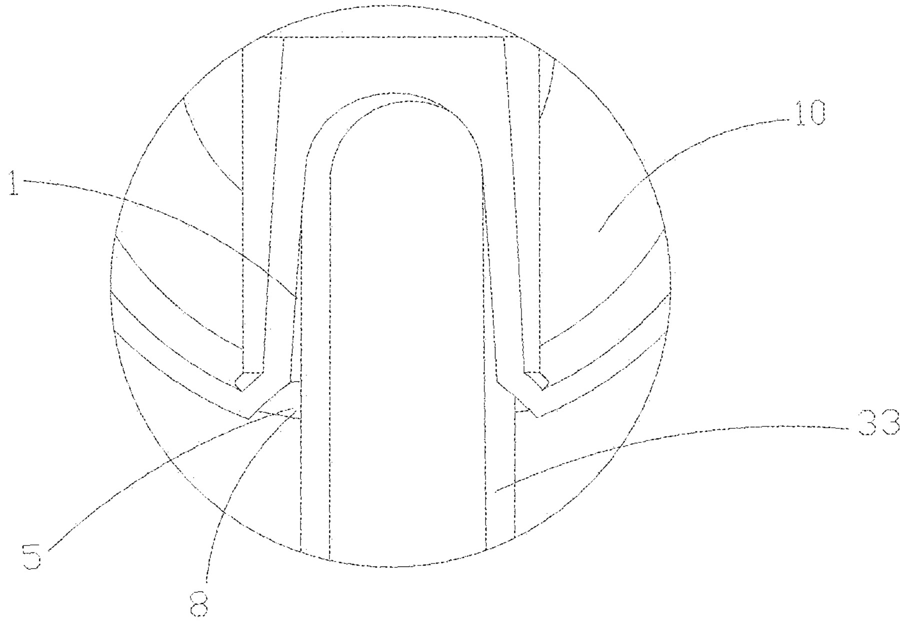
FIG. 11 is a structural diagram of area B in FIG. 10 of the first embodiment of the present disclosure.

Referring to FIG. 1-FIG. 11, the present disclosure provides a rotatable writing pen. The writing pen includes a pen main body 10 and a supporting structure 20. The supporting structure 20 is configured for supporting the pen main body 10. The pen main body 10 is capable of rotating on the supporting structure 20. Through the above structure, the supporting structure 20 is capable of supporting the pen main body 10. Users can pivot the pen main body 10, causing it to rotate on the supporting structure 20. This rotation has a stress-relieving function, thereby increasing the entertainment value of the writing pen. The inclined surface 5 can provide a self-guiding function, enabling the pen main body 10 to return automatically to its initial position upon a slight wobble, so as to improve rotational stability. The structure of the inclined surface ensures that the pen main body 10 can automatically return to a central position during rotation, thereby achieving self-alignment. The inner top wall and the inner side wall of the first groove 1 have smooth surfaces, so as to reduce friction during rotation. The first gap 6 serves to reduce a contact area between the supporting structure 20 and the first groove 1, thereby reducing the friction between the supporting structure 20 and the first groove 1. This prevents the rotation of the pen main body 10 on the supporting structure 20 from being interrupted due to eccentric friction. Consequently, the number of rotations of the pen main body 10 can be effectively increased, so as to significantly enhance both the stress-relieving effect and visual appeal.

In the present embodiment, a first groove 1 is defined in the pen main body 10, and the first groove 1 is defined adjacent to a center of gravity of the pen main body 10. A first end of the supporting structure 20 is positioned in the first groove 1. Through the above structure, the first end of the supporting structure 20 is positioned in the first groove 1, and the supporting structure 20 can support the pen main body 10 for rotation. Therefore, the pen main body 10 will not detach from the supporting structure 20 during rotation. The first groove 1 is located within a ±10% lengthwise range of a cross section where the center of gravity of the pen main body 10 is situated.

In the present embodiment, the supporting structure 20 includes a supporting base 2 and a supporting portion 3. The supporting portion 3 is connected to the supporting base 2, and the supporting portion 3 is arranged on the supporting base 2. A top end of the supporting portion 3 is received within the first groove 1 and is configured for abutting against an inner top wall of the first groove 1. Through the above structure, the supporting portion 3 is capable of supporting the pen main body 10, so that the pen main body 10 will not detach from the supporting portion 3 during rotation. A diameter of the supporting portion 3 gradually decreases from bottom to top, which increases the stability of the supporting portion 3. The supporting portion 3 is not in contact with the inner side wall of the first groove 1, thereby reducing the friction by 50% to 80%.

In the present embodiment, the supporting base 2 is provided with an arc-shaped outer surface, and a diameter of the supporting base 2 gradually decreases from top to bottom. A bottom portion of the supporting base 2 is provided with a flat supporting surface 21. A mounting groove 22 is defined in the bottom portion of the supporting base 2. The mounting groove 22 is configured for mounting a first anti-slip pad 23. The supporting surface 21 is arranged around the mounting groove 22. The supporting structure 20 is further provided with a counterweight groove 4 configured for placing a counterweight member 9. The counterweight groove 4 is provided with an accommodating opening 41. The mounting groove 22 is arranged around an edge of the accommodating opening 41. The first anti-slip pad 23 is configured for covering the counterweight groove 4 and the mounting groove 22. The first anti-slip pad 23 is a flexible anti-slip pad. Through the above structure, the supporting structure 20 is provided with the counterweight groove 4 for receiving the counterweight member 9, so that the supporting structure 20 can stably support the pen main body 10. Therefore, even when the pen main body 10 is in a rotating state, the position of the supporting structure 20 remains unchanged, thereby enhancing both user engagement characteristics and the stability of the writing pen. The counterweight member 9 placed in the counterweight groove 4 may be made of a steel sheet, a copper member, a tungsten alloy, a magnetic material, or other high-density metals.

In the present embodiment, the top end of the supporting portion 3 is provided with a first protruding arc-shaped contact surface 31. The inner top wall of the first groove 1 is provided with a second recessed arc-shaped contact surface 11. The second arc-shaped contact surface 11 is configured for abutting against the first arc-shaped contact surface 31. Through the above structure, the second arc-shaped contact surface 11 is configured for abutting against the first arc-shaped contact surface 31. This effectively reduces the contact area, significantly lowers the coefficient of friction, and thereby effectively prevents jamming. Therefore, this results in an extension of the rotation duration by approximately 30% to 200%.

In the present embodiment, an inner side wall of the first groove 1 is a cylindrical side wall. An inclined surface 5 is arranged around a periphery of an opening of the first groove 1. Through the above structure, a depth of the first groove 1 is in a range from 1 mm to 6 mm, and an inner diameter of the first groove 1 is in a range from 1 mm to 6 mm. An angle between the inclined surface 5 and the inner side wall of the first groove 1 is in a range from 1 degree to 80 degrees. Specifically, this above-mentioned angle is preferably in a range from 10 degrees to 45 degrees. The inner top wall and inner side wall of the first groove 1 have smooth surfaces, so as to reduce friction generated during rotation. The pen main body 10 may be made of metal, stainless steel, aluminum material, engineering plastic, or a composite material. The rotation duration of the pen main body 10 can last from 15 seconds to 60 seconds. This rotation duration varies depending on the material of the pen main body 10. Furthermore, the inclined surface 5 can provide a self-guiding function, enabling the pen main body 10 to return automatically to its initial position upon a slight wobble, so as to improve rotational stability. The structure of the inclined surface ensures that the pen main body 10 can automatically return to a central position during rotation, thereby achieving self-alignment.

In the present embodiment, a first gap 6 is provided between the supporting structure 20 and the first groove 1. A second gap 7 is provided between the supporting structure 20 and an outer edge of the inclined surface 5. The second gap 7 is larger than the first gap 6, and a width of the first gap 6 is in a range from 0.1 mm to 3 mm. Through the above structure, the first gap 6 can reduce the contact area between the supporting structure 20 and the first groove 1, thereby lowering the friction between the supporting structure 20 and the first groove 1. Therefore, this prevents the rotation of the pen main body 10 on the supporting structure 20 from being interrupted due to eccentric friction. This can effectively increase the number of rotations of the pen main body 10 and significantly enhance both the stress-relieving effect and visual appeal. Furthermore, the second gap 7 is larger than the first gap 6, which allows the pen main body 10 to have a larger wobble angle during rotation.

In the present embodiment, the inclined surface 5 includes a front side section 51, a rear side section 52, a left side section 53, and a right side section 54. The left side section 53 and the right side section 54 are connected to the front side section 51 and the rear side section 52. Second gaps 7 are formed between the supporting structure 20 and the front side section 51 as well as between the supporting structure 20 and the rear side section 52. Third gaps 8 are formed between the supporting structure 20 and the left side section 53 as well as between the supporting structure 20 and the right side section 54. The third gaps 8 are different from the second gaps 7. Through the above structure, since the third gaps 8 are different from the second gaps 7, the forward-backward wobble angle differs from the left-right wobble angle of the pen main body 10, thereby providing an enhanced visual effect during rotation. The wobble angle of the pen main body 10 can be controlled within 5 degrees. Moreover, the arrangement of the second gap 7 and the third gap 8 ensures smooth rotation of the pen main body with minimal noise and better stress-relieving effect.

In the present embodiment, the supporting portion 3 includes a transition portion 32 and a first supporting member 33. The first supporting member 33 is connected to the transition portion 32. The transition portion 32 is provided with an arc-shaped outer surface, and a diameter of the transition portion 32 gradually decreases from bottom to top. The first supporting member 33 is a cylindrical supporting member. Through the above structure, the diameter of the transition portion 32 gradually decreases from bottom to top, this effectively reduces the contact area between the top end of the first supporting member 33 and the first groove 1, which facilitates smoother rotation. Furthermore, the first supporting member 33 is a cylindrical supporting member, so that each position of the first supporting member 33 is configured to maintain a first gap 6 with the first groove 1. Therefore, this reduces the contact area between the supporting portion 3 and the first groove 1, lowers the friction between the supporting structure 20 and the first groove 1, and prevents the rotation of the pen main body 10 on the supporting portion 20 from being interrupted due to eccentric friction. Consequently, the number of rotations of the pen main body 10 is effectively increased, thereby significantly enhancing both the stress-relieving effect and visual appeal. Furthermore, even if the height of the supporting structure 20 is greater than its width, the transition portion 32, whose diameter gradually decreases from bottom to top, can provide more stable support. This lowers the center of gravity of the supporting portion 3, and prevents the supporting base 2 from tipping over during rotation. In addition, this provides the supporting structure 20 with a more aesthetically pleasing, minimalist, and three-dimensional appearance.

In the present embodiment, the pen main body 10 includes a gripping portion 30. The gripping portion 30 includes a front gripping portion 34 and a rear gripping portion 35. The front gripping portion 34 is connected to the rear gripping portion 35. The front gripping portion 34 is provided with a first protruding arc-shaped gripping surface 341. The rear gripping portion 35 is provided with a second recessed arc-shaped gripping surface 351. A diameter of the front gripping portion 34 first gradually increases and then gradually decreases along a lengthwise direction, to form the first protruding arc-shaped gripping surface 341. A diameter of the rear gripping portion 35 first gradually decreases and then gradually increases along a lengthwise direction, to form the second recessed arc-shaped gripping surface 351. Through the above structure, the front gripping portion 34 has a convexly arc-shaped outer surface, and the rear gripping portion 35 has a concavely arc-shaped outer surface. This design conforms to ergonomic principles and facilitates more effortless writing. The design of the gripping portion 30 accommodates users' gripping habits. Moreover, the pen main body 10 is made of a lightweight material with a smooth surface for easy grip. The first protruding arc-shaped gripping surface 341 facilitates gripping by the fingers, while the second recessed arc-shaped gripping surface 351 is adapted to rest against the web of the user's hand (an area between the thumb and the index finger), thereby further facilitating a secure and comfortable grip.

In the present embodiment, the pen main body 10 further includes a tip sleeve 11 and a first refill 12. A first cavity 13 is defined in the pen main body 10, and a first end of the first cavity 13 is provided with a first opening 14. A first end of the first refill 12 is arranged in the first cavity 13. A second end of the first refill 12 passes through the first opening 14 and is located at an exterior of the first cavity 13. The tip sleeve 11 is sleeved on the first refill 12 and is connected to the front gripping portion 34. Through the above structure, the tip sleeve 11 is configured to secure the first end of the first refill 12 within the first cavity 13, and the first end of the first refill 12 is threadedly connected to the front gripping portion 34. The first refill 12 is configured for writing. The tip sleeve 11 is securely connected to the front gripping portion 34 via internal threads and external threads, so as to ensure the sealing effect. Furthermore, the first opening 14 facilitates the installation of the first refill 12 into the first cavity 13.

In the present embodiment, an end portion of the rear gripping portion 35 is provided with an arc-shaped protective end face 36. The first groove 1 is defined in the front gripping portion 34. Through the above structure, the front gripping portion 34 is made relatively thick. In this way, by defining the first groove 1 in the front gripping portion 34, the first groove 1 is positioned adjacent to a center of mass. Therefore, the pen main body 10 can achieve a gyroscopic rotational stability. Moreover, the arc-shaped protective end face serves to prevent puncture injuries.

In the present embodiment, a first end of the pen main body 10 is located below the first arc-shaped contact surface 31. In addition, a second end of the pen main body 10 is located above the first arc-shaped contact surface 31, so that the pen main body 10 is placed obliquely on the supporting structure 20. Through the above structure, this causes the pen main body 10 to swing, thereby providing an enhanced visual effect during rotation. The height of the supporting structure 20 is greater than its width. Through the above structure, the supporting structure 20 not only can support the pen main body 10, but also can enable the pen main body 10 to maintain at a certain height, so that even when the pen main body 10 tilts during rotation, it does not contact the ground to impede the rotation.

The Second Embodiment

Figure 12:
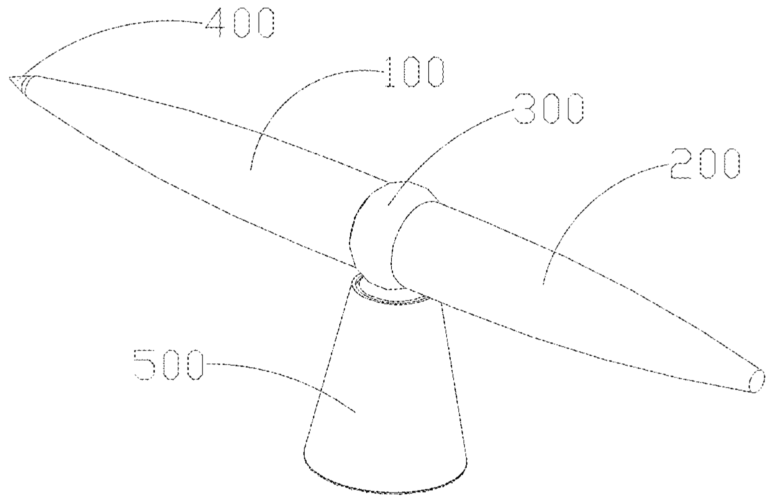
FIG. 12 is a structural diagram of the second embodiment of the present disclosure.
Figure 13:
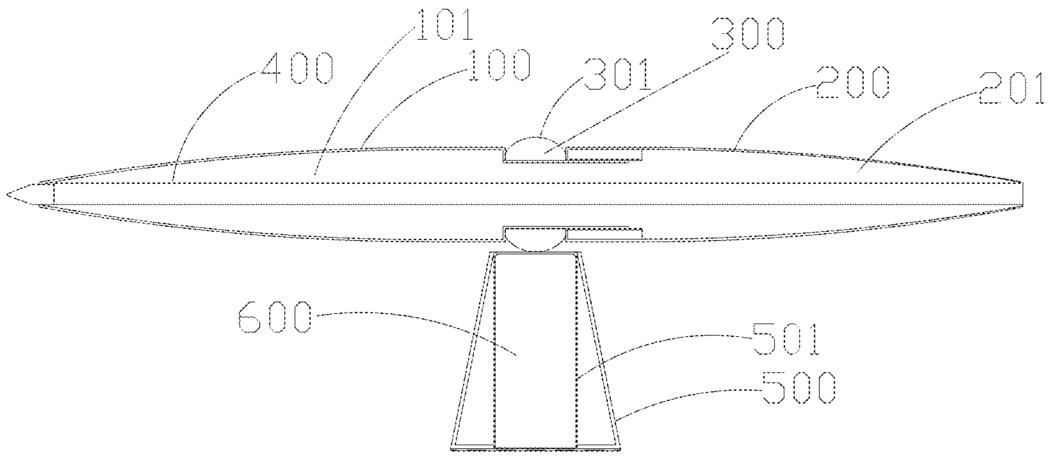
FIG. 13 is a sectional view of the second embodiment of the present disclosure.
Figure 14:
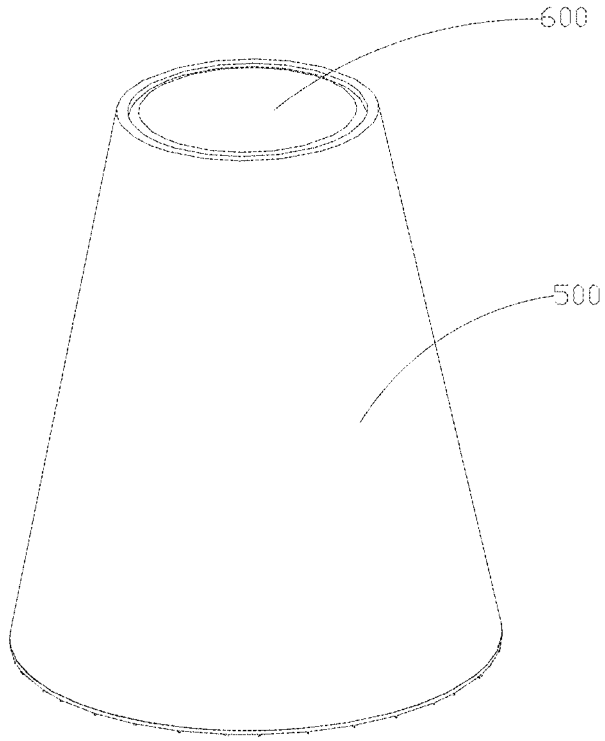
FIG. 14 is a structural diagram of the supporting structure in the second embodiment of the present disclosure.
Figure 15:
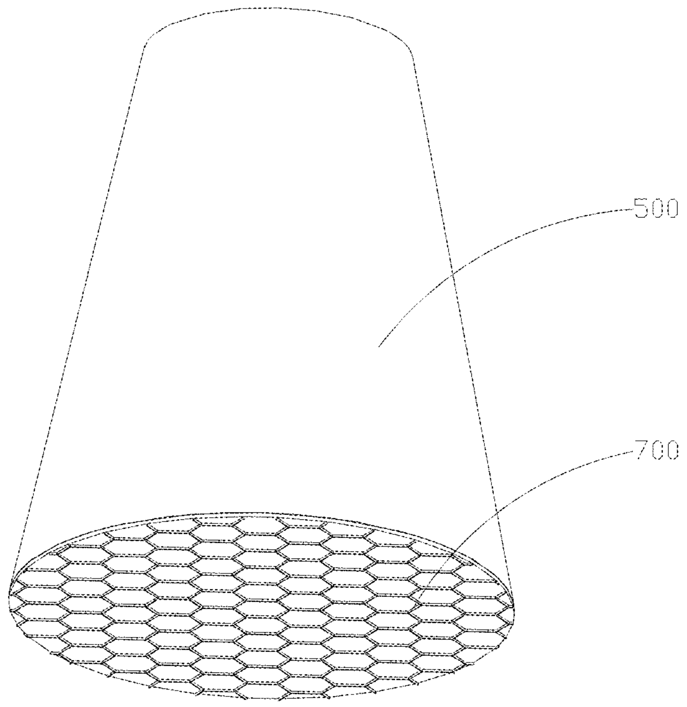
FIG. 15 is a structural diagram of the supporting structure from another angle according to the second embodiment of the present disclosure.

Referring to FIG. 12-FIG. 15, the pen main body 10 includes a first rotating portion 100 and a second rotating portion 200. The first rotating portion 100 is threadedly connected to the second rotating portion 200. The pen main body 10 further includes a first magnetic attraction member 300. The first magnetic attraction member 300 is sleeved on a junction between the first rotating portion 100 and the second rotating portion 200. The first magnetic attraction member 300 is configured for protruding from outer surfaces of the first rotating portion 100 and the second rotating portion 200. The supporting structure 20 is magnetically attracted to the first magnetic attraction member 300. The first magnetic attraction member 300 is a first annular magnetic attraction member. The first magnetic attraction member 300 is provided with an arc-shaped magnetic outer surface 301. The first magnetic attraction member 300 is arranged at a middle portion of the pen main body 10. Through the above structure, the supporting structure 20 is magnetically attracted to the first magnetic attraction member 300. The supporting structure 20 is configured for supporting the first rotating portion 100 and the second rotating portion 200. By pivoting the first rotating portion 100 or the second rotating portion 200, users can cause the first rotating portion 100, the second rotating portion 200, and the first magnetic attraction member 300 to rotate together. This provides a stress-relieving function, thereby increasing entertainment value of the writing pen. Furthermore, the first magnetic attraction member 300 is mounted at the junction between the first rotating portion 100 and the second rotating portion 200. In addition, the first rotating portion 100 and the second rotating portion 200 have substantially equal length and weight. Therefore, the first magnetic attraction member 300 is positioned at the middle portion of the pen main body 10. This ensures that the pen main body 10 does not tilt obviously during rotation. Additionally, the first magnetic attraction member 300 is configured for protruding from the outer surfaces of the first rotating portion 100 and the second rotating portion 200. Therefore, this can reduce the contact area between the pen main body 10 and the supporting structure 20, thereby significantly reducing the friction between these two components. The arc-shaped magnetic outer surface 301 of the first magnetic attraction member 300 can reduce the drag force caused by variations in magnetic flux density at the edge, thereby resulting in smoother rotation. This lowers the required initial angular velocity for startup and facilitates easier rotation. Moreover, by being arranged at the middle portion of the pen main body 10, the first magnetic attraction member 300 is configured to generate a self-balancing torque. This makes the writing pen less prone to wobble during rotation, effectively extends the rotation duration, and reduces the wobble angle to within 3 degrees.

In the present embodiment, the writing pen 10 further includes a second refill 400. A third cavity 101 is defined in the first rotating portion 100, and a fourth cavity 201 is defined in the second rotating portion 200. The third cavity 101 is in communication with the fourth cavity 201. A first end of the second refill 400 is positioned in the fourth cavity 201. A second end of the second refill 400 passes through the third cavity 101 and is located at an exterior of the first rotating portion 100. Through the above structure, the first rotating portion 100 and the second rotating portion 200 are connected to each other via internal threads and external threads. This connection facilitates the placement of the second refill 400 inside the rotating portion 10, and also facilitates the removal of the second refill 400 from the pen main body 10 for replacement.

In the present embodiment, the supporting structure 200 includes a second supporting base 500, and a fifth cavity 501 is defined in the second supporting base 500. A second magnetic attraction member 600 is arranged in the fifth cavity 501. The second magnetic attraction member 600 is magnetically attracted to the first magnetic attraction member 300. Through the above structure, the second supporting base 500 is configured for supporting the pen main body 10. The first magnetic attraction member 300 and the second magnetic attraction member 600 are magnetically attracted to each other. This enables the pen main body 10 to be securely placed on the second supporting base 500 without unintended disengagement. In addition, the pen main body 10 is enabled to rotate on the second supporting base 500 and may not detach from the second supporting base 500. The magnetic attractive force between the first magnetic attraction member and the second magnetic attraction member is in a range from 10 grams-force to 200 grams-force. When the pen main body 10 deviates from the center, this magnetic attractive force generates a horizontal component, thereby causing it to automatically return to a central position. This results in a more stable rest position of the writing pen after the rotation stops. Furthermore, the magnetic attractive force stabilizes the rotational trajectory, thereby reducing bouncing and vibration of the pen main body 10. Consequently, the rotation duration of the pen main body 10 is extended, with an improvement of 30% to 150%.

In the present embodiment, a second anti-slip pad 700 is arranged at a bottom portion of the second supporting base 500. A height of the second supporting base 500 is greater than a width of the second supporting base 500. Through the above structure, the second anti-slip pad 700 provides the second supporting base 500 with additional anti-slip capability, thereby preventing the second supporting base 500 from moving inadvertently when placed on a desktop. The height of the second supporting base 500 is greater than the width of the second supporting base 500. In this way, the second supporting base 500 not only can support the pen main body 10, but also can enable the pen main body 10 to maintain at a certain height. Therefore, even when the pen main body 10 tilts during rotation, it does not contact the ground to impede the rotation. Furthermore, this writing pen can also function as a decision-making aid. For instance, when facing multiple options, users can spin the pen to randomly select one. After the pen stops, the option pointed to by the pen tip is determined as a final choice, thereby assisting in decision-making. In addition, the pen can function as a game tool, such as in scenarios where the person indicated by the tip sleeve 11 of the pen is subject to a game penalty.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

The invention claimed is:

1. A rotatable writing pen, comprising:

a pen main body;

a supporting structure, wherein the supporting structure is configured for supporting the pen main body, and the pen main body is capable of rotating on the supporting structure;

wherein a first groove is defined in the pen main body, and the first groove is defined adjacent to a center of gravity of the pen main body; a first end of the supporting structure is positioned in the first groove;

wherein an inner side wall of the first groove is a cylindrical side wall, and an inclined surface is arranged around a periphery of an opening of the first groove.

2. The rotatable writing pen according to claim 1, wherein the supporting structure comprises a supporting base and a supporting portion, the supporting portion is connected to the supporting base, and the supporting portion is arranged on the supporting base; a top end of the supporting portion is received within the first groove and is configured for abutting against an inner top wall of the first groove.

3. The rotatable writing pen according to claim 2, wherein the supporting base is provided with an arc-shaped outer surface, and a diameter of the supporting base gradually decreases from top to bottom; a bottom portion of the supporting base is provided with a flat supporting surface; a mounting groove is defined in the bottom portion of the supporting base, the mounting groove is configured for mounting a first anti-slip pad, and the supporting surface is arranged around the mounting groove; the supporting structure is further provided with a counterweight groove configured for placing a counterweight member, the counterweight groove is provided with an accommodating opening, and the mounting groove is arranged around an edge of the accommodating opening; the first anti-slip pad is configured for covering the counterweight groove and the mounting groove; the first anti-slip pad is a flexible anti-slip pad.

4. The rotatable writing pen according to claim 2, wherein the top end of the supporting portion is provided with a first protruding arc-shaped contact surface; the inner top wall of the first groove is provided with a second recessed arc-shaped contact surface, and the second arc-shaped contact surface is configured for abutting against the first arc-shaped contact surface.

5. The rotatable writing pen according to claim 4, wherein a first end of the pen main body is located below the first arc-shaped contact surface, and a second end of the pen main body is located above the first arc-shaped contact surface, so that the pen main body is placed obliquely on the supporting structure.

6. The rotatable writing pen according to claim 2, wherein the supporting portion comprises a transition portion and a first supporting member, the first supporting member is connected to the transition portion, the transition portion is provided with an arc-shaped outer surface, and a diameter of the transition portion gradually decreases from bottom to top; the first supporting member is a cylindrical supporting member.

7. The rotatable writing pen according to claim 1, wherein a first gap is provided between the supporting structure and the first groove; a second gap is provided between the supporting structure and an outer edge of the inclined surface, and the second gap is larger than the first gap; a width of the first gap is in a range from 0.1 mm to 3 mm.

8. The rotatable writing pen according to claim 1, wherein the inclined surface comprises a front side section, a rear side section, a left side section, and a right side section, the left side section and the right side section are connected to the front side section and the rear side section, second gaps are formed between the supporting structure and the front side section as well as between the supporting structure and the rear side section, third gaps are formed between the supporting structure and the left side section as well as between the supporting structure and the right side section, and the third gaps are different from the second gaps.

9. The rotatable writing pen according to claim 1, wherein the pen main body comprises a gripping portion, the gripping portion comprises a front gripping portion and a rear gripping portion, the front gripping portion is connected to the rear gripping portion, the front gripping portion is provided with a first protruding arc-shaped gripping surface, and the rear gripping portion is provided with a second recessed arc-shaped gripping surface.

10. The rotatable writing pen according to claim 9, wherein the pen main body further comprises a tip sleeve and a first refill, a first cavity is defined in the pen main body, a first end of the first cavity is provided with a first opening, a first end of the first refill is arranged in the first cavity, and a second end of the first refill passes through the first opening and is located at an exterior of the first cavity; the tip sleeve is sleeved on the first refill and is connected to the front gripping portion.

11. The rotatable writing pen according to claim 9, wherein an end portion of the rear gripping portion is provided with an arc-shaped protective end face, and the first groove is defined in the front gripping portion.

12. The rotatable writing pen according to claim 9, wherein a diameter of the front gripping portion first gradually increases and then gradually decreases along a lengthwise direction, to form the first protruding arc-shaped gripping surface; a diameter of the rear gripping portion first gradually decreases and then gradually increases along a lengthwise direction, to form the second recessed arc-shaped gripping surface.

13. The rotatable writing pen according to claim 1, wherein a height of the supporting structure is greater than a width of the supporting structure.

14. A rotatable writing pen, comprising:

a pen main body;

a supporting structure, wherein the supporting structure is configured for supporting the pen main body, and the pen main body is capable of rotating on the supporting structure;

wherein the pen main body comprises a first rotating portion and a second rotating portion, and the first rotating portion is threadedly connected to the second rotating portion;

wherein the pen main body further comprises a first magnetic attraction member, the first magnetic attraction member is sleeved on a junction between the first rotating portion and the second rotating portion, and the first magnetic attraction member is configured for protruding from outer surfaces of the first rotating portion and the second rotating portion; the supporting structure is magnetically attracted to the first magnetic attraction member, the first magnetic attraction member is a first annular magnetic attraction member, and the first magnetic attraction member is provided with an arc-shaped magnetic outer surface; the first magnetic attraction member is arranged at a middle portion of the pen main body.

15. The rotatable writing pen according to claim 14, wherein the writing pen further comprises a second refill, a third cavity is defined in the first rotating portion, a fourth cavity is defined in the second rotating portion, and the third cavity is in communication with the fourth cavity; a first end of the second refill is positioned in the fourth cavity, and a second end of the second refill passes through the third cavity and is located at an exterior of the first rotating portion.

16. The rotatable writing pen according to claim 14, wherein the supporting structure comprises a second supporting base, a fifth cavity is defined in the second supporting base, a second magnetic attraction member is arranged in the fifth cavity, and the second magnetic attraction member is magnetically attracted to the first magnetic attraction member.

17. The rotatable writing pen according to claim 16, wherein a second anti-slip pad is arranged at a bottom portion of the second supporting base, and a height of the second supporting base is greater than a width of the second supporting base.

* * * * *